United States Patent [19]

Kristy

[11] Patent Number: 4,744,021

[45] **Date of Patent: * May 10, 1988**

[54] COMPUTER CONTROLLED DEADBOLTS

[76] Inventor: Brickton D. Kristy, 515 Ocean Ave., Apt. 608, Santa Monica, Calif. 90402

[ * ] Notice: The portion of the term of this patent subsequent to Feb. 4, 2003 has been disclaimed.

[21] Appl. No.: 825,335

[22] Filed: Feb. 1, 1986

[51] Int. Cl.[4] ........................ G06F 15/20; H01H 47/32

[52] U.S. Cl. .................................... 364/141; 364/400; 361/172; 70/278; 340/825.31

[58] Field of Search ........................ 364/130, 138–142, 364/146, 174, 401, 424, 425, 400; 340/542, 545–547, 825.31; 361/170–172, 182–184, 189–193; 70/277–280

[56] References Cited

U.S. PATENT DOCUMENTS

| | | | |
|---|---|---|---|
| 3,725,939 | 4/1973 | Saltzstein | 70/277 X |
| 3,733,861 | 5/1973 | Lester | 70/278 X |
| 3,854,310 | 12/1974 | Paull et al. | 70/280 |
| 4,079,605 | 3/1978 | Bartels | 70/277 |
| 4,083,424 | 4/1978 | Von Den Stemmen et al. | 70/278 X |
| 4,148,092 | 4/1979 | Martin | 361/172 |
| 4,317,157 | 2/1982 | Ecloff | 361/172 X |
| 4,366,466 | 12/1982 | Lutz | 361/172 |
| 4,428,024 | 1/1984 | Mochida et al. | 361/172 |
| 4,449,385 | 5/1984 | Thirion et al. | 70/277 |
| 4,509,093 | 4/1985 | Stellberger | 361/172 |
| 4,568,998 | 2/1986 | Kristy | 361/172 |
| 4,593,544 | 6/1986 | Claar et al. | 70/277 X |

*Primary Examiner*—Gary V. Harkcom

*Attorney, Agent, or Firm*—William H. Maxwell

[57] ABSTRACT

An electronic lock system for positioning one or more deadbolts, and responsive to a passive signal encoded and imposed upon a radio carrier wave, the carrier wave being received and decoded and passed into a computer that controls operation of a drive for closed and opened positioning of the deadbolt, or deadbolts, the computer being responsive to an obstructed deadbolt, responsive to door opening and closing, and indicating the locked and unlocked condition of the system.

17 Claims, 4 Drawing Sheets

COMPUTER CONTROLLED DEADBOLTS

It is a general object of this invention to advantageously employ a microcomputer and to reduce the complexity of controlling circuitry in a deadbolt system of the type under consideration, without losing the functions and advantages normally expected thereof. A first objective is remote control, and this feature is provided herein by means of an encoded signal of digital character transmitted by radio. A second objective is the radio reception and decoding of the signal for alternate actuation of the computer, to command either a locked or an unlocked condition. A third objective is motor control over the locked and unlocked conditions, and this feature is twofold as herein disclosed. Firstly, the deadbolt motor, or motors are either energized or de-energized by a power means. Secondly, the deadbolt motor, or motors are either directed to lock or unlock by a direction means. A fourth objective is motor protection against a malfunction, such as the obstruction of a deadbolt, by a circuit protection means. And, a fifth objective is the indication of deadbolt condition, either locked or unlocked, by indicator means. It is to be understood that there are various other advantages that will become apparent, all as hereinafter described.

BACKGROUND OF THE INVENTION

This invention relates to deadbolts or locks for securing doors and the like, and will be disclosed in its adaptation to a multiplicity of automobile doors and subject to the operation of that type of vehicle. It is an object of this invention to provide security, and for example to prevent access or "breaking of the close" and alternately to permit access for ingress and egress. Heretofore, most locks have been key operated or combination operated, with mechanical limitations on key distinction and/or combination, and consequently subject to insercurity. That is, lock tumbler positioning can be determined by outsiders, or thieves and the like, and pass keys are available; all to the end that mechanical lock security is restricted and not entirely reliable. A state of the art locking device of the type under consideration utilizes electronics for the release of a deadbolt, as disclosed in U.S. Pat. No. 3,733,861 issued to Robert W. Lester May 22, 1973 and entitled ELECTRONIC RECOGNITION DOOR LOCK, wherein a transponder transmits a range of ultrasonic signals of varying frequency, which equal a code sequentially both in time, length and frequency. The three sequential timed signals are received by transducers and transmitted to a shift register that activates a bolt releasing solenoid, only after signals are received in the proper sequence. The Lester system is feasible but is unnecessarily complicated and restrictive through its indirect mode of operation, and therefore not entirely practical. Accordingly, it is an object of this invention to provide an improved electronic security system having a direct mode of operation over locked devices and closures, whereby the lock closing and opening codes are not only unpredictable but are substantially increased in number of the combinations available for greater security; the digital signals used herein being distinct "passive codes".

SUMMARY OF THE INVENTION

State of the art electronics and electric actuation and control apparatus as well as a power source therefore are all extremely reliable and the operation thereof predictable. It is an object therefore to employ electronics and its associated means of employment as a securement where locks and the like are usually employed. With the present invention, passive electronic coding replaces sequentially timed coding and mechanical devices and/or combination means, greatly simplifying and substantially increasing reliability and the finite choice of so-called opening combinations. As will be described, a digital signal is encoded and transmitted, and then received and decoded to control deadbolt operation.

An actively occupied dwelling or vehicle can be expected to have a readily available and reliable power source, namely electrical power. It is therefore an object of this invention to employ available electrical power as the force to exclusively operate the electronics and motivation of the lock or deadbolt as it is disclosed herein. The wiring and control unit installations are readily secreted so as to be inaccessible to the would-be intruder, and operational reliability is ensured by readily available high quality electronics and associated electrical components installed in a tamperproof manner. Accordingly, the system of the present invention is entirely electronic and/or electrical and in no instance can the circuits be preempted and the lock or deadbolt defeated.

The operation of a lock involves closing and opening, and since this invention is concerned particularly with exclusive electronic actuation, both the closing and opening modes of operation are automatically controlled by a single digital signal. Therefore, it is an object of this invention to provide cooperative encoding and decoding of a digital signal code, and which is associated with power control and directional switching of motor means by which the lock or deadbolt is alternately driven to a closed or an opened position.

Safe operation of a vehicle requires door egress at any time, for example in the case of an emergency. Therefore, it is an object of this invention to preempt the locking condition during vehicle operation; and in this disclosure by the actuation of the auto ignition switch to the "ON" position. Thus, while the vehicle is operating the deadbolt, or deadbolts are maintained in the opened condition, and alternately when the vehicle is out of operation and the ignition switch "OFF", the deadbolt is conditioned so that is can be closed. Opening is assured by the ignition switch being "ON", while closing is passive and permitted by the ignition switch being "OFF". It is also an object to provide indicator lights to indicate the opened and closed condition of any and all doors, and to preempt vehicle operation if so desired.

It is an object of this invention to ensure deactivation of the automatic alternate opening and closing motor operations of the deadbolt. To this end, limit switches are employed to open the motor power circuit when the deadbolt is in either extreme position.

It is also an object of this invention to provide for any failure of the deadbolt penetration into the bolt hole or door jamb. To this end, an electrical pressure sensing means is provided, disassociated with limit switches, as will be described.

This invention is concerned with an electronic device that locks by power operation, and is characterized by producing a passive code comprised of a digital signal that is simultaneously encoded and transmitted and then decoded. The digital signal is imposed upon a designated and lawful carrier wave frequency for radio transmission, and used for remote or outside control of the locking device. A feature of this invention is the concealment and innaccessibility of the active components involved, and this necessitates automation in the form of a motor driven deadbolt. In practice, the deadbolt is motor driven into closed and opened positions, automated by the output of a decoder. A major use of this deadbolt system is for automotive security, in which case positioning of the deadbolt is cooperatively associated with operation of the vehicle by conditions imposed by the vehicle ignition switch to preempt closing of the deadbolt. An anti-jam feature is included to prevent damage in the event of incomplete door closure or other obstruction preventing proper operation of the deadbolt. When activated, this anti-jam feature causes a deadbolt to abandon its attempt to occupy the closed position and returns all deadbolts to the opened position.

The foregoing and various other objects and features of this invention will be apparent and fully understood from the following detailed description of the typical preferred forms and applications thereof, throughout which description reference is made to the accompanying drawings.

Figure 6:
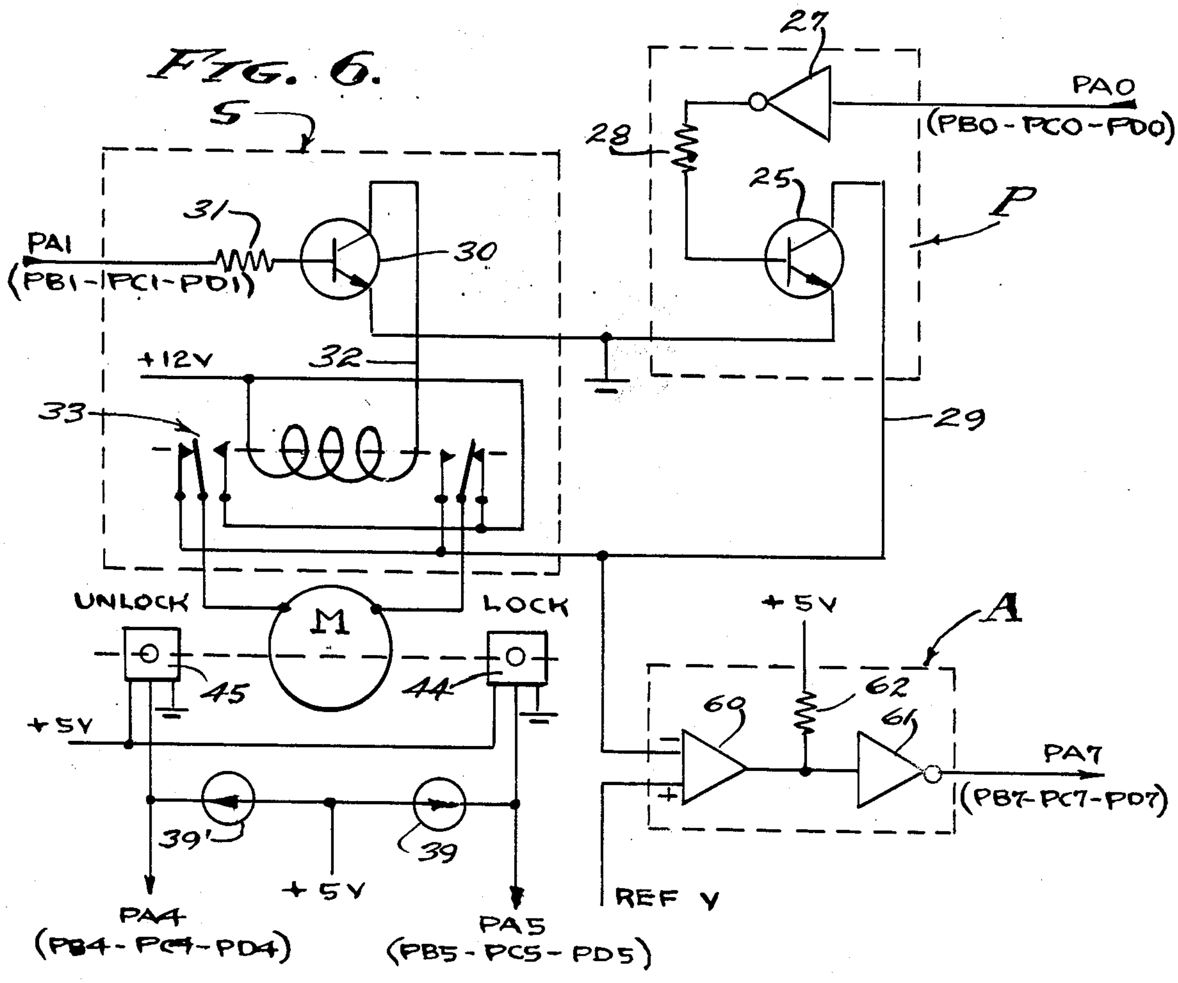
FIG. 6 is a schematic diagram of the power and directional control and motor protection circuitry, as it is related to the microcomputer and pins thereof which are employed herein.
Figure 2:
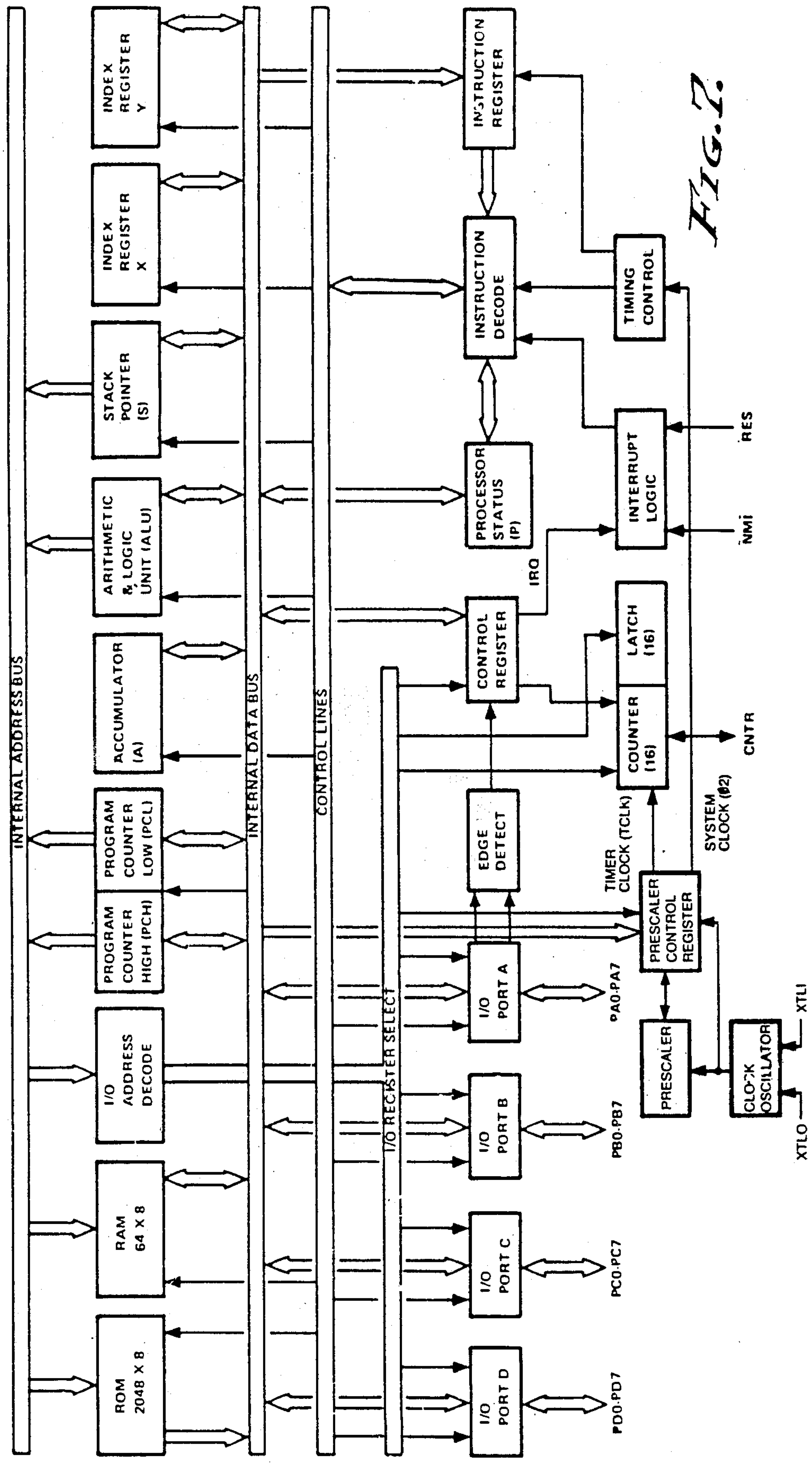

And, FIG. 7 is a block diagram of the chip which comprises the preferred microcomputer that is employed herein and related to the diagram of FIG. 6.

PREFERRED EMBODIMENT

Figure 1:
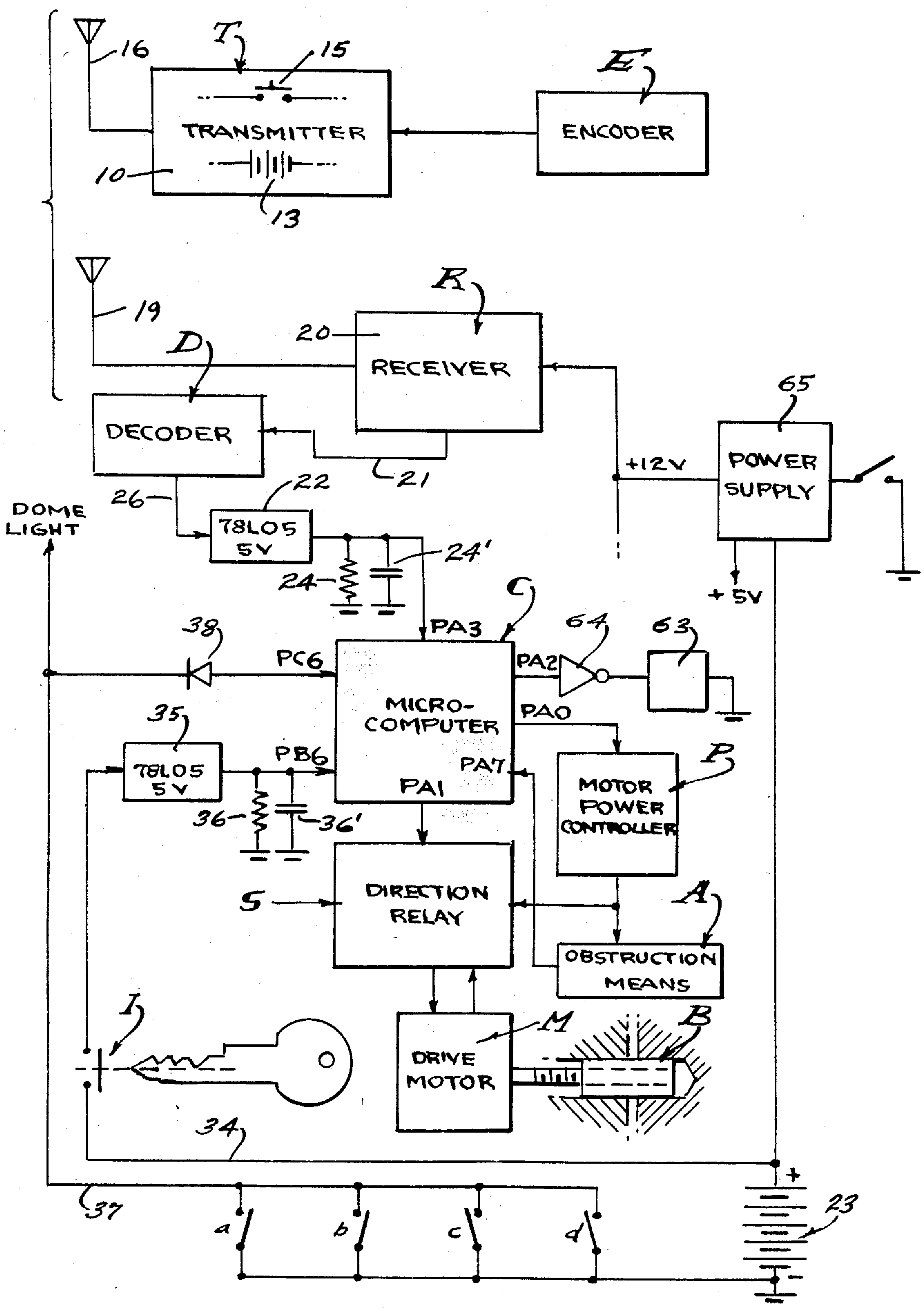
FIG. 1 is a block diagram showing the computer controlled deadbolt system of the present invention, characterized by a transmitting encoder and a receiving decoder.

Referring now to FIG. 1 of the drawings, the electronic lock and/or deadbolt system of the present invention involves, generally, a transmitter T to send an encoded signal, a receiver R to receive the transmitted signal, a computer means C to control a power conditioner for the operation of a motor or motors M, and that controls switch means S to govern operation of the motor or motors M, thereby alternately driving a bolt or bolts B between "closed" and "opened" positions. In automotive applications of this device or system there is preempting means to shift the bolt B to an "open" position by closing the vehicle ignition switch I. The transmitter T is a remote or outside control means that is portable and adapted to be personally hand carried and operated as a unit. A receiver R, a decoder means D, a computer means C, a power control means P, and a direction means S are all installed as a unit in a secure and inaccessible place within the dwelling or vehicle, or other place of security in any such construction to be secured. And, the bolt B and drive motor M are inaccessibly installed as a unit, or units, within the door structures to be secured. It is to be understood that inaccessibility is attained when the door is closed and locked by the system.

The transmitter T is the code key element of this system and is a battery operated radio control unit comprised of a radio transmitter means 10 coupled to an encoder means E. The transmitter T is activated by a push button or toggle switch 15 in a circuit from a battery 13. The transmitting frequency broadcast from antenna 16 is for example 303.875 MHz. And, the encoded signal from the encoder means E is digital and is assigned to the owner of each of these Computer Controlled Deadbolt systems, as a distinct code, all as may be desired and as circumstances require.

The receiver R is the code radio responsive element of this system and is a powered radio control unit comprised of a radio receiver means 20 coupled to the decoder means D by conductor 21. The receiver R is activated by a +12 v power supply shown as a battery 23, and it receives the aforementioned carrier wave and digital signal through an antenna 19. The receiving frequency is the same as the aforementioned transmitting frequency, for example 303.875 MHz. Only the owner's assigned digital signal code is justified by the decoder means D, and in compliance to the reception of the complementary code signal a voltage is simultaneously applied through a conductor 26 to the input pin PA3 of computer means C. In practice, the output signal from the decoder means D through conductor 26 is 0 or +12 volts, which alternates with each sequentially distinct coded signal received by the decoder means. Since the input pin PA3 of the microcomputer requires 0 or +5 volts for its operation, a five volt regulator 22 (78L05), a pull down resistor 24 and a capacitor 24' for filtering are used in the conductor 26 circuit, as shown.

Figure 2:
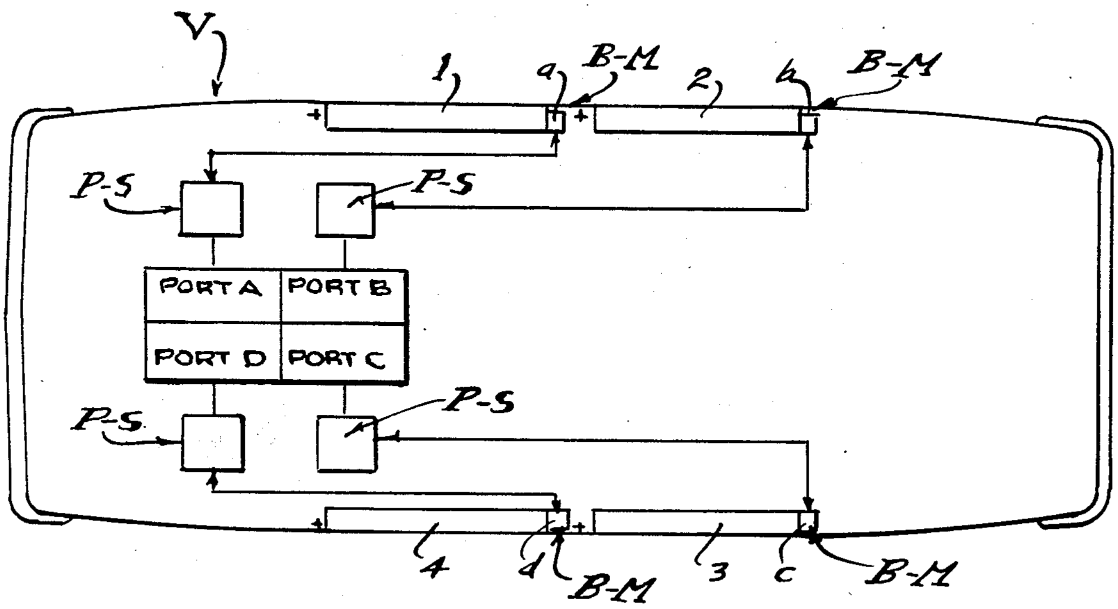
FIG. 2 is a plan view of a vehicle having four doors protected by deadbolts and associated with the separate ports of a microcomputer.
Figure 4:
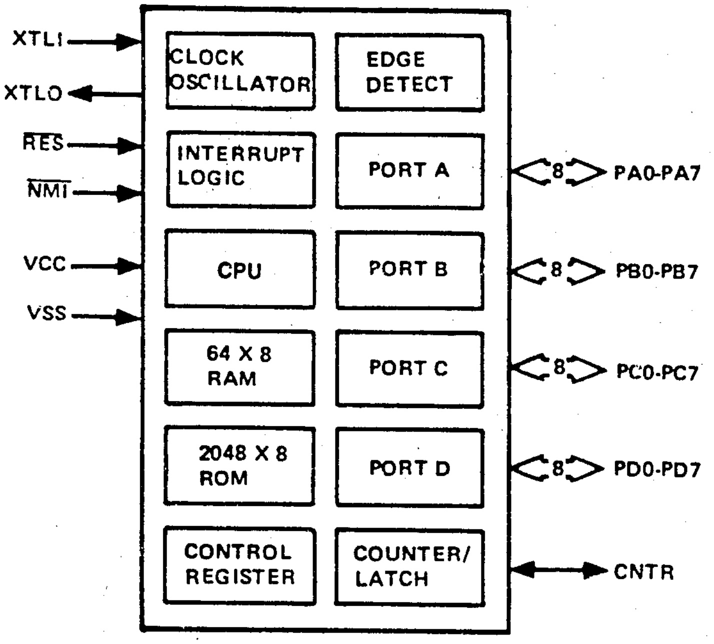
FIG. 4 is an interface diagram of the microcomputer that is preferred to be employed in carrying out this invention.
Figure 5:
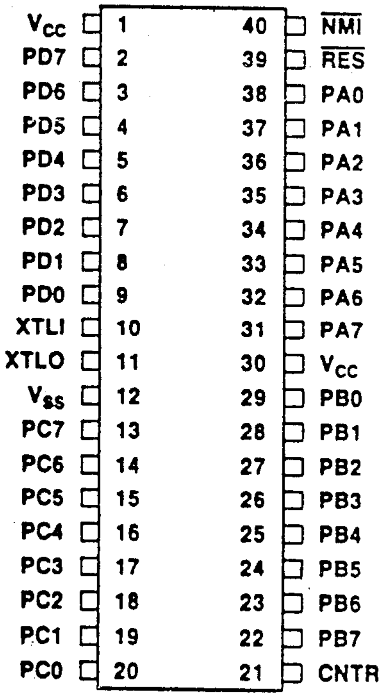
FIG. 5 is a diagram of the pin assignments of the microcomputer as it is described herein.

The computer means C is preferably a microcomputer in the form of a "chip" having ports A, B, C and D associated respectively with and opening and closing the dead bolts of doors 1, 2, 3 and 4 of a vehicle V (see FIG. 2). It is to be understood that such a computer and the ports thereof can be related to the separate doors of a dwelling and other such compartments or areas to be secured. This microcomputer chip has two primary functions, firstly to power up the motor or motors M when a voltage corresponding to a code signal is received through conductor 26, and secondly to determine the closing or opening direction of rotation for the motor or motors M. The preferred microcomputer employed and disclosed herein is that manufactured by ROCKWELL INTERNATIONAL of Newport Beach, Calif., as No. R65C10, having an interface with the functions as shown in FIG. 4 of the drawings, and characterized by a four port configuration with pins assigned as shown in FIG. 5 of the drawings, The microcomputer of computer means C includes program means to have a latching relay function to hold closed the circuitry from pins PA0, PB0, PC0 and PD0 to power control means P, and from pins PA1, PB1, PC1 and PD1 to direction means S, until released by either one of the limit switches through pins PA4 or PA5, PB4 or PB5, PC4 or PC5 and PD4 or PD5, as later described. Further, the microcomputer of computer means C also includes program means through pin PB6 to condition the switch means S to open and unlock the bolts at doors 1, 2, 3 and 4 when the ignition key switch I is "ON". Still further, the microcomputer of computer means C also includes program means through pin PC6 to open and/or unlock the bolt or bolts when any one of the vehicle doors 1 through 4 is open or ajar.

In accordance with this invention, a control unit comprised of the power control means P and the direction means S is required for each deadbolt to be automated. In the vehicle V illustrated herein there are four deadbolts B and motors M, one for each door 1, 2, 3 and 4, and accordingly there are four control circuits, each as shown in FIG. 6 of the drawings. As shown, the motor drive M and deadbolts B are remote from the control means P and S and the computer means C related thereto (see FIG. 2).

Figure 3:
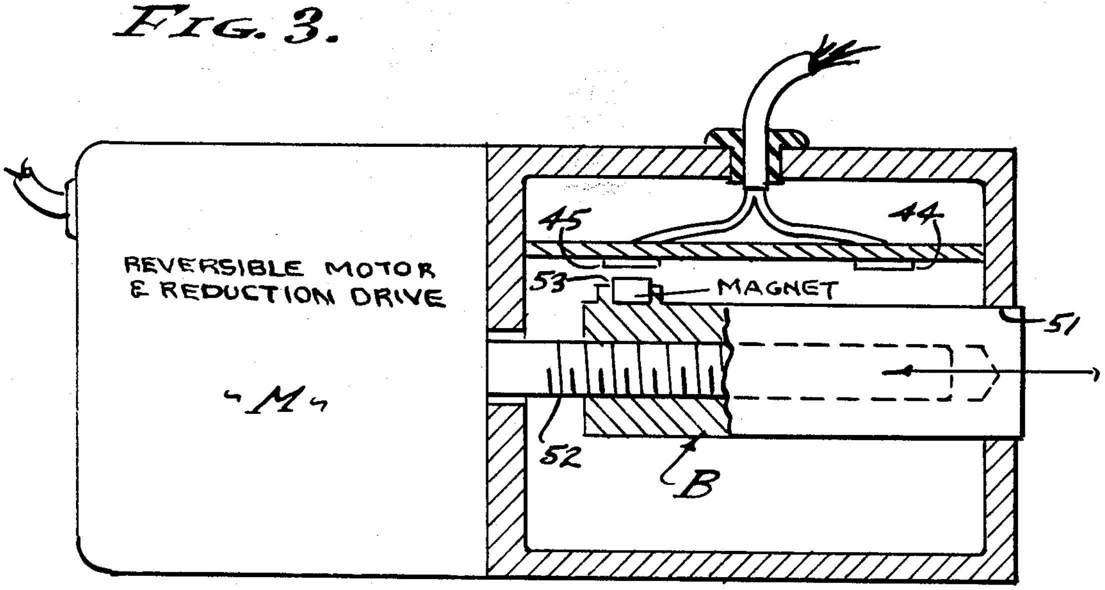
FIG. 3 is an enlarged detailed sectional view of the motorized deadbolt drive showing the bolt as it is related to limit switches.

Referring to FIG. 3 of the drawings, there is a deadbolt B slideably carried in a guide 51 to be transported between "closed" and "opened" positions by screw 52 reversably rotated by the motor M. A magnet 53 installed on the deadbolt to move therewith into said closed and opened positions beneath Hall Effect sensors 44 and 45 react as limit switches responsive to said two extreme positions. The motor M reversably rotates the screw 52 to advance and to retract the deadbolt, shown retracted in FIG. 3 where the sensor 45 responds to the magnet 53.

The power control means P is comprised of a transistor switch 25 in circuit with a responsive to pin PA0 (PB0 - PC0 - PD0) of the microcomputer, so that when pin PA0 goes Low the power will be applied to the motor M. Since the transistor switch 25 is closed by the application of a High, the circuit to the base thereof is in series through an inverter 27 and a current limiting resister 28. Transistor switch 25 grounds a circuit 29 to the relay of the direction means S, when closed to power up the motor M.

The direction means S is a switching means comprised of a transistor switch 30 in circuit with and responsive to alternate High and Low conditions at pin PA1 (PB1 - PC1 - PD1) of the micropomputer, so that when the pin PA1 goes Low the motor M is rotated to close the bolt B, and so that when the pin PA1 goes High the motor M is rotated to open the bolt B. The circuit to the base of transistor switch 30 is in series through a current limiting resister 31. The transistor switch 30 grounds a circuit 32 to the coil of a switching relay 33, so as to move the contacts thereof from a normally closed (bolt closed) condition to an actuated open (bolt open) condition, when pin PA1 produces a High. Thus, the bolt B is normally closed or locked, and alternately it is opened by a High signal from pin PA1. As shown, the switching relay 33 is double pole double throw and adapted to reverse polarity of the voltage applied to the motor M from the above described power control means P.

Referring again to the bolt position sensors 44 and 45 hereinabove described, actuation of sensor 44 grounds a circuit to pin PA5 (PB5 - PC5 - PD5) to stop the motor M in a closed, locked, position, while actuation of sensor 45 grounds a circuit to pin PA4 (PB4 - PC4 - PD4) to stop the motor M in an opened, unlocked, position. The microcomputer program means responds to either of these grounded conditions to replace the Low of pin PA0 (PB0 - PC0 - PD0) with a High, whereupon the power transistor switch 25 is open to ground and motor M ceases to operate. A feature is that when the bolt is operated to the open unlocked position, the sensor 45 is activated and sends a Low signal to the microcomputer through pin PA4 to turn PA1 to a Low and to transistor switch 30 to open relay 33, thereby conserving power.

The operation of the computer controlled circuitry hereinabove described is predicated upon the master key control of the ignition switch I, so that the bolt or bolts B move from closed, locked, positions to open, unlocked, positions when the key switch I is closed to +12 volts. This features overrides operation by means of the transmittion T, by means of program means through pin PB6 of the microcomputer. The key switch I is in circuit 34 through pin PB6, the computer program means responding thereto to put pin PA0 (PB0 - PC0 - PD0) Low, and to put pin PA1 (PB1 - PC1 - PD1) High, whereby the motor or motors M are powered up through relay switch 33 to move the bolts B to the opened, unlocked, positions. In practice, the +12 volts from the battery 23 through ignition switch I is not compatable with the requirements of the microcomputer, since the input pin PA6 requires 0 or +5 volts for its operation. Therefore, a five volt regulator 35, a pull down resistor 36 and a capacitor 36' for filtering are used in the conductor circuit 34, as shown.

In the event that any door is ajar or not fully closed, the conventional pin switches at said vehicle doors are employed herein to indicate that condition. As shown in FIGS. 1 and 2, the door switches a, b, c and d are normally open switches that close when the door is ajar or open. These switches are in parallel and each is in circuit 37 to pin PC6 of the microcomputer and program means therein to hold all bolts B open or unlocked when PC6 goes to ground through closure of one or more of said switches, whereby PA0 (PB0 - PC0 - PD0) goes low, and PA1 (PB1 - PC1 - PD1) goes High. The vehicle dome light and/or audio indicator (not shown) is operated by +12 volts, and since the microcomputer does not tolerate that voltage, a diode 38 is positioned ahead of PC6 for that protection, while permitting PC6 to go to ground through switches a, b, c and d.

In order to indicate the position of the bolt, there is a light emitting diode (LED) 39 in circuit to sensor 44, and a light emitting diode (LED) 39' in circuit to sensor 45; both from +5 volts as shown in FIG. 6. Therefore, the LED's light up when switches 44 or 45 close to ground.

As a protective feature, this invention provides an obstruction sensing means A, shown in FIG. 6 of the drawings as an amplifier 60 that compares a positive reference voltage with motor M voltage, and produces a signal at PA7 (PB7 - PC7 - PD7) when an obstruction occurs. If and when the deadbolt meets an obstruction, moving in either direction, the motor M slows or stops and causes resistance therein to drop and to increase current flow proportionately. The voltage drop across transistor switch 25 is fed to a terminal (−) of amplifier 60 which functions as a comparator. When there is no obstruction the output of the amplifier-comparator 60 is pulled High by a pull-up resistor 62 and inverted to a Low by an inverter 61 in circuit to PA7 of the microcomputer program means permitting normal operation. If and when a significant obstruction occurs, the voltage across transistor switch 25 rises above the reference (+) voltage which causes the amplifier-comparator 60 output to gc Low. This Low is inverted to a High (+5 v) indicating an obstruction to the microcomputer program means. The microcomputer program means is responsive to two conditions, firstly an obstruction to the closing or locking mode whereupon a low goes to PA0 - PB0 - PD0 and a High goes to PA1 - PB1 - PC1

- PD1; and secondly an obstruction in the opening or unlocking mode whereupon a High goes only to PA0 or PB0 or PC0 or PD0 related only to the obstructed bolt B and motor M thereof. When an obstruction has occurred, in either mode as above described, the program means energizes an indicator means such as a buzzer 63 through an inverter 64 from pin PA2 of the microcomputer.

From the foregoing it will be seen that the electronic code controlled deadbolt herein described is particularly suited for automotive use and is associated with the ignition switch I and operational requirements of the vehicle in which it is to be installed. Such a requirement is that an operating vehicle must be accessible for both ingress and egress, and to this end the circuitry hereinabove described is dependent for its operation upon the condition of the vehicle doors, that is whether they are opened or closed. As shown, electrical energy for the electronics and motor power for the deadbolt is from a power supply 65 and +12 volt battery and producing +5 volts with negative taps. The number of microcomputer ports used can vary dependent upon the number of deadbolts to be serviced.

Having described only the typical preferred form and application of my invention, I do not wish to be limited or restricted to the specific details herein set forth, but wish to reserve to myself any modifications or variations that may appear to those skilled in the art as set forth within the limits of the following claims.

I claim:

1. A computer programed lock system for power positioning of at least one deadbolt into closed and opened positions in a door jamb and including;

- a radio transmitter including encoder means switched to place a distinct code signal on a carrier wave,
- a radio receiver tuned to said carrier wave and including decoder means responsive to justify said distinct code signal and produce sequentially distinct voltage signals,
- computer means having means therein responsive to the sequentially distinct voltage signals and a first program means activated thereby to produce and hold a power-up signal and alternately a motor direction "open" and "close" signal, and having a second program means responsive to at least one deadbolt position sensor to drop the power-up signal,
- a power control means responsive to the first program means of the computer producing the power-up signal to energize a motor circuit.
- a direction means responsive to the first program means of the computer means producing alternately the motor "open" and "close" signal and including a signal responsive switch energizing a relay between motor "open" and motor "close" positions,
- a reversible motor for moving the deadbolt between "open" and "close" positions in response to the relay positions,
- and the deadbolt position sensor responding to a position thereof and the second program means of the computer means responsive thereto to limit said position of the deadbolt by dropping the motor circuit and stopping the motor.

2. The computer programed lock system as set forth in claim 1, wherein the encoder means produces a distinct digital code signal, and wherein the decoder means responds to justify said digital code signal.

3. The computer programed lock system as set forth in claim 1, wherein the first program means of the computer means produces a Low or High signal and wherein the power control means includes a transistor switch responsive thereto to position the deadbolt by powering-up and dropping the motor circuit.

4. The computer programed lock system as set forth in claim 1, wherein the first program means of the computer means normally produces a High signal and goes Low to produce the power-up signal, there being an inverter responsive to the Low signal and in circuit through a transistor switch to power-up the motor circuit.

5. The computer programed lock system as set forth in claim 1, wherein the first program means of the computer means alternately produces High and Low direction signals, and wherein the direction means includes a transistor switch responsive thereto to position the relay in the "open" and "close" positions.

6. The computer programed lock system as set forth in claim 1, wherein the first program means of the computer means alternately produces High and Low signals as and corresponding to the "open" and "close" direction signals, and wherein the direction means includes a transistor switch positioning the relay in an open position responsive to a High signal, and in a close position responsive to a Low signal.

7. The computer programed lock system as set forth in claim 6, wherein the relay is double pole double throw with contact means in the motor circuit and reversed in polarity between an unactuated and an actuated position thereof.

8. The computer programed lock system as set forth in claim 1, wherein the deadbolt position sensor is a Hall Effect switch responsive to a magnet carried by the deadbolt.

9. The computer programed lock system as set forth in claim 1, wherein there is a deadbolt position sensor at both the "open" and "close" positions of the deadbolt to drop the power-up signal at each end of its travel.

10. The computer programed lock system as set forth in claim 1, wherein there is a deadbolt position sensor at both the "open" and "close" positions of the deadbolt and each comprised of a switch closing a circuit to a position indicator.

11. The computer programed lock system as set forth in claim 1, wherein the computer means includes means responsive to closing a master switch to over-ride the first program means of the computer means and hold the power-up signal and the motor direction "open" signal.

12. The computer programed lock system as set forth in claim 1, wherein the first program means of the computer means holds the power-up signal and the motor direction "open" signal responsive to at least one door switch actuated by opening said door.

13. The computer programed lock system as set forth in claim 1, wherein the computer includes obstruction sensing means responsive to a signal from an amplifier-comparator with inputs from the motor circuit and from a reference voltage and with an output to the first program means of the computer means to drop the power-up signal when the motor circuit voltage is increased.

14. The computer programed lock system as set forth in claim 1, wherein the computer means includes a multiplicity of ports and one for each deadbolt to be positioned, there being a power control means and a direction means for each deadbolt independently controlled thereby.

15. The computer programed lock system as set forth in claim 14, wherein the first program means of the computer means is responsive in the "close" mode of operation to power-up the multiplicity of deadbolt motor circuits.

16. The computer programed lock system as set forth in claim 14, wherein the first program means of the computer means is responsive in the "open" mode of operation to drop the power-up signal when the deadbolt is obstructed.

17. The computer programed lock system as set forth in claim 1, wherein the computer means includes a multiplicity of ports and one for each deadbolt to be positioned, there being a power control means and a direction means for each deadbolt independently controlled thereby, wherein the first program means of the computer means is responsive in the "close" mode of operation to power-up the multiplicity of deadbolt motor circuits, and wherein the first program means of the computer means is responsive in the "open" mode of operation to drop the power-up signal when the deadbolt is obstructed.

* * * * *